(12) United States Patent
Mannbar et al.

(10) Patent No.: US 10,264,418 B2
(45) Date of Patent: Apr. 16, 2019

(54) METHOD AND SYSTEM FOR WIRELESS TRANSMISSION OF INFORMATION IN AUTOMATION TECHNOLOGY

(71) Applicant: Endress+Hauser Process Solutions AG, Reinach (CH)

(72) Inventors: Uwe Mannbar, Village Neuf (FR); Christoph Meyer, Röschenz (CH); Werner Thoren, Steinen (DE); Daniel Nazimek, Müllheim (DE)

(73) Assignee: Endress+Hauser Process Solutions AG, Reinach (CH)

( * ) Notice: Subject to any disclaimer, the term of this patent is extended or adjusted under 35 U.S.C. 154(b) by 0 days.

(21) Appl. No.: 15/746,396

(22) PCT Filed: Jun. 22, 2016

(86) PCT No.: PCT/EP2016/064375
§ 371 (c)(1),
(2) Date: Jan. 19, 2018

(87) PCT Pub. No.: WO2017/012812
PCT Pub. Date: Jan. 26, 2017

(65) Prior Publication Data
US 2018/0199170 A1 Jul. 12, 2018

(30) Foreign Application Priority Data
Jul. 21, 2015 (DE) .................. 10 2015 111 841

(51) Int. Cl.
*H04W 4/30* (2018.01)
*G05B 19/418* (2006.01)
(Continued)

(52) U.S. Cl.
CPC ............ *H04W 4/30* (2018.02); *G05B 19/418* (2013.01); *G05B 19/41855* (2013.01);
(Continued)

(58) Field of Classification Search
CPC ..... H04L 12/00; H04L 12/40; H04L 12/4625; H04L 2012/4026; H04W 4/06; H04W 4/30; H04W 4/38
See application file for complete search history.

(56) References Cited

U.S. PATENT DOCUMENTS

| | | | | |
|---|---|---|---|---|
| 2012/0182943 A1* | 7/2012 | Bahr | ............. | H04W 40/26 370/328 |
| 2015/0365939 A1* | 12/2015 | Zhang | ............. | H04W 72/0446 370/336 |
| 2016/0063029 A1* | 3/2016 | Mu | ............. | H04L 67/1097 707/620 |

\* cited by examiner

*Primary Examiner* — Mewale A Ambaye
(74) *Attorney, Agent, or Firm* — Mark A. Logan; PatServe

(57) ABSTRACT

The disclosure includes a method of automation technology for wireless transmission of at least a first information between an initiator and a plurality of receivers in a receiving mode, comprising: transmitting the first information by the initiator in a first communication pulse; receiving the first information by at least one receiver; transmitting an additional communication pulse containing the same first information as the first communication pulse, by at least one receiver that received the first communication pulse, and changing the at least one receiver into an acknowledgment mode; repeating the previous step, until all receivers are changed into the acknowledgment mode; activating at least one receiver, which is located in the acknowledgment mode; performing the at least one additional command contained in the received first information by the activated receiver; and changing the activated receiver into the receiving mode. The disclosure also includes a system suitable for performing the method of the invention.

16 Claims, 2 Drawing Sheets

(51) Int. Cl.
  *H04L 12/00* (2006.01)
  *H04L 12/46* (2006.01)
  *H04L 12/40* (2006.01)
  *H04W 4/06* (2009.01)
  *H04W 4/38* (2018.01)
(52) U.S. Cl.
  CPC .............. *H04L 12/00* (2013.01); *H04L 12/40* (2013.01); *H04L 12/4625* (2013.01); *G05B 2219/25428* (2013.01); *H04L 2012/4026* (2013.01); *H04W 4/06* (2013.01); *H04W 4/38* (2018.02)

METHOD AND SYSTEM FOR WIRELESS TRANSMISSION OF INFORMATION IN AUTOMATION TECHNOLOGY

CROSS-REFERENCE TO RELATED APPLICATIONS

The present application is related to and claims the priority benefit of German Patent Application No. 102015111841.6, filed on Jul. 21, 2015 and International Patent Application No. PCT/EP2016/064375 filed on Jun. 22, 2016, the entire contents of which are incorporated herein by reference.

TECHNICAL FIELD

The invention describes a method and a system of automation technology for wireless transmission of at least a first information between at least one initiator and a plurality of receivers located in a receiving mode.

BACKGROUND

Known from the state of the art are field devices used in industrial plants. In process automation technology, same as in manufacturing automation technology, field devices are often applied. Referred to as field devices are, in principle, all devices, which are applied near to the process and which deliver, or process, process relevant information. Thus, field devices are used for registering and/or influencing process variables. Serving for registering process variables are measuring devices, e.g. sensors. These are used, for example, for pressure- and temperature measurement, conductivity measurement, flow measurement, fill level measurement, etc. and register the corresponding process variables, pressure, temperature, conductivity, pH-value, fill level, flow, etc. Used for influencing process variables are actuators. These are, for example, pumps or valves, which can influence the flow of a liquid in a pipe or the fill level in a container. Besides the above mentioned measuring devices and actuators, also falling under the terminology, field devices, are remote I/Os, radio adapters, and, in general, devices, which are arranged at the field level.

A large number of such field devices are produced and sold by the Endress+Hauser-group of companies.

In modern industrial plants, field devices are, as a rule, connected with superordinated units via bus systems, such as ProfiBus®, FOUNDATION Fieldbus®, HART®, etc. bus systems. Normally, the superordinated units are control systems, or control units, such as, for example, a PLC (programmable logic controller). The superordinated units serve, among other things, for process control, process visualizing, process monitoring, as well as for start-up of field devices. The measured values registered by field devices, here especially by sensors, are transmitted via the particular bus system to a superordinated unit or, in given cases, to a number of superordinated units. Along with that, there occurs also, for the purpose of configuring, parametering, and diagnosis of field devices or for the purpose of operating actuators, a data transmission from the superordinated unit via the bus system to the field devices.

Besides a wired data transmission between the field devices and the superordinated unit, wireless data transmission, i.e. radio transmission of data, is also important. Especially wireless HART® transmission is an established standard. For implementing wireless data transmission, newer field devices, especially sensors and actuators, are, in part, embodied as radio field devices. These have, as a rule, a radio unit and an electrical current source as integral components, wherein the electrical current source enables an autarkic electrical current supply of the field device.

Devices, which support the wireless HART®-protocol, can be ordered with already preconfigured network settings. However, it is in certain situations necessary to change these networks settings. Moreover, field devices, which have no ex factory preconfigured network settings, must be configured for network integration. In these cases, the required network settings are transmitted by means of cable connection to each individual field device. Used for this are PC-based configuration programs, such as, for example, FieldCare of Endress+Hauser, Pactware, Emerson AMS or Siemens PDM, or handheld-based configuration programs, such as Field Xpert of Endress+Hauser or Emerson 475. This procedure is very time consuming, since each field device of a plant must be separately configured.

Described in DE 10 2008 043 170 A1 is a method for integrating an additional field device into a radio network of automation technology, wherein a number of field devices have already been integrated. In such case, integration parameters of the network are ascertained by means of a service device or a field device located in the vicinity of a participant to be newly integrated and then transmitted to the new participant, whereby this is integrated into the network.

Disclosed in DE 10 2008 003 575 A1 is a method for integrating a new participant node into a wireless communication network of process automation. In such case, based on predetermined criteria, such as, for example, based on locational information, an already integrated node is selected and placed in an integration mode, which enables integration of the new participant node into the network.

Disadvantageous in the case of both methods is that only one participant is integrated. The integration of a plurality of participants thus becomes extremely time consuming. Moreover, in the case of these methods, already existing network participants are required, so that construction of a network from the ground up is not possible. Also, it is not possible to obtain information from a participant or to transmit to it, without integrating it into the network.

SUMMARY

An object of the invention is to provide a method and a system, with whose help information can be transmitted between a plurality of participants as efficiently as possible.

The invention is achieved by a method of automation technology for wireless transmission of at least a first information between at least one initiator and a plurality of receivers located in a receiving mode, comprising steps as follows:

transmitting the first information, which contains a command for passing the first information on and at least one additional command, by the initiator in a first communication pulse;

receiving the information by at least one receiver;

transmitting an additional communication pulse, which contains the same first information as the first communication pulse, by the at least one informed receiver, which has received the earlier sent communication pulse, and changing the one or more informed receivers into an acknowledgment mode;

repeating the previous step, until all receivers are changed into the acknowledgment mode;

activating at least one receiver, which is located in the acknowledgment mode;

performing the at least one additional command contained in the received first information by the activated receiver; and changing the activated receiver into the receiving mode.

Referred to as initiator is that device, which transmits the first communication pulse, and, thus, initiated passing-on of the information to the entire number of receivers.

The great advantage of the method of the invention is that the information propagates exponentially over the receivers. This propagation occurs undirected and without restrictions. This means that a receiver has no information concerning from which informed receiver the information originates, which receivers it then informs and whether or how many receivers are located in its range. The propagation of the communication pulse occurs spherically. In this way, it is assured that as many receivers as possible receive a transmitted communication pulse. With the help of the method of the invention, it is, thus, possible to distribute the information over the entire number of receivers, for example, field devices in a factory building, in fast and efficient manner, without it being necessary that the receivers execute the at least one additional command contained in the information.

The changing into the acknowledgment mode is signaled by means of a lighted up LED on a receiver. So long as the receiver is located in this acknowledgment mode, the LED blinks, or lights durably. In addition to, or instead of, the indication by means of LED, an acoustic signal is issued that informs the user of the changing into the acknowledgment mode.

In an advantageous embodiment of the method of the invention, the receivers, which have received the communication pulses, change for a defined time into the acknowledgment mode, before changing back into the receiving mode. If not all receivers are to be activated, then the remaining receivers can in this way automatically change back into the receiving mode. Moreover, this can prevent that an overlooked receiver remains durably in the acknowledgment mode, so that a repeating of the method of the invention is not possible. Additionally, this prevents that too much energy is consumed by the LED or acoustic signals, because of continuing operation in the acknowledgment mode.

An advantageous embodiment of the method of the invention provides that a dedicated radio channel is used for transmitting the communication pulses. This means that information transfer in an existing network is not degraded. The actual information transfer occurs, moreover, frequently via a narrow transmission band, whose center frequency is changed according to a predetermined pattern, this being referred to as "frequency hopping". A fixedly predetermined radio channel assures that the receivers can receive and forward the communication pulses at any time, independently of the particular center frequency of the actual radio transmission.

In an advantageous further development of the method of the invention, transmitted in the communication pulse is information concerning the number n of earlier sent pass-ons. Each receiver is thereby informed of the number of previous pass-ons and sends the current pass-on number.

In an especially advantageous embodiment of the method of the invention, the number n of pass-ons is limited. Thus, one or more receivers, which are located in the vicinity of the initiator, can be informed, without that the communication pulse must be passed on by the entire number of receivers.

An especially advantageous extension of the method of the invention provides that the transmission power of the communication pulses is limited. The transmission power of the communication pulses determines their range. By limiting the transmission power, the available energy of the initiator and the receivers can be optimally managed. If the receivers are locally near to one another, then a low transmission power is sufficient that a transmitted communication pulse reaches at least one not yet informed receiver. In the case of large distances of the receivers from one another, for example, in a large factory building, the transmission power can be accordingly increased, whereby the range of the communication pulses rises and these also, in this case, reach as yet uninformed receivers.

In an advantageous further development of the method of the invention, the informed receiver is activated in the acknowledgment mode by pressing a button on the receiver. Alternatively, it is activated by means of a touchpad located on the receiver, or via a radio capable, mobile end device.

A variation of the method of the invention provides that the other command contained in the sent first information contains a request for providing and/or for transmitting process data of a receiver to the initiator. In this way, process data can be obtained efficiently from all receivers.

In an especially advantageous embodiment of the method of the invention, the other command contained in the sent first information is an invitation for integration into a wireless network and the receivers are either already integrated participants, which exclusively forward the first information, or potential participants, which forward the first information and change into the acknowledgment mode. For the method, it is, thus, of no consequence, whether the receivers are already located in a network, since the steps are performed in parallel with the actual tasks of the receivers and do not degrade and/or influence them.

An especially advantageous further development of the method of the invention includes steps as follows:

sending a report back from at least one potential participant to the initiator after the activating of the potential participant;

sending access parameters for the wireless network from the initiator to the potential participant; and integrating the potential participant into the wireless network.

Thus, it is possible to integrate one or more on potential participants in efficient and time saving manner into an already existing wireless network. It is, moreover, possible to take a wireless network with a number of potential participants rapidly and automatically from the ground up into operation. The start-up occurs, moreover, extremely safely, since safety-relevant data, such as, for example, network key, are transmitted invisibly to the user.

An advantageous variation of the method of the invention provides that the potential participant, which receives a communication pulse, automatically sends identification data to the initiator, without changing into the acknowledgment mode, wherein the initiator compares the identification data with a list and, in the case of agreement, the potential participant is automatically integrated into the wireless network. Thus, the integration of one or more potential participants can occur yet more efficiently, since the activating of the potential participants into the acknowledgment mode no longer has to be done manually by the user.

In an especially preferred embodiment of the method of the invention, there occurs after receipt of the first information further information exchange bidirectionally between the receiver and the initiator for transmission of at least one additional information; moreover, this information exchange occurs analogously to the steps for pass-on of the first information, wherein the other information is passed on via the receivers and the receivers remain in the receiving mode.

The great advantage of this embodiment of the method of the invention is that the other information is passed on in the same manner as the first information, whereby these communications also mean no limitation of the actual tasks of the receiver, since these methods steps occur in parallel with the actual tasks of the receiver.

The object is, moreover, also achieved by a system comprising at least one initiator and a plurality of receivers for wireless transmission of the at least first information, which system is suitable for performing the method of the invention.

The initiator implements for this purpose an algorithm, which generates the at least first communication pulse and its first information, composed of the command for pass-on of the first information and at least the one additional command. The receivers implement an algorithm, which enables the pass-on of a communication pulse to other receivers upon receipt of such a communication pulse and the subsequent changing into the acknowledgment mode. A variant provides that the initiator generates a communication pulse, which supplementally to the first information, composed of the command for pass-on of the first information and at least the one additional command, includes the algorithm for the receivers. Thus, the receiver does not have to have the algorithm ex factory, and, in the case of non-in factory implementation, the user does not have to implement such in the receiver before start-up.

In an advantageous further development, the initiator and the receivers are components of automation technology and possess wireless communication units. The receivers and the initiator can, moreover, also be mobile end devices or mobile servicing devices.

In an especially advantageous embodiment of the system of the invention, the initiator is a superordinated unit and the receivers are field devices. The initiator can be, for instance, a PLC or any other kind of controller. Furthermore, the initiator can also be a gateway, a network manager or a field device.

In a preferred variation, the system is composed of a wireless network, in the case of which the receivers (A, B, C, . . . , H) are either already integrated participants ($T_1$, $T_2$) or potential participants ($P_1$, $P_2$, $P_3$), wherein the wireless network is a wireless network of automation technology, especially wireless HART®. Wireless HART® is, however, only one example of the many conventional wireless networks. Of course, the method of the invention is not limited to this protocol, but, instead, is applicable in combination with any other wireless network of automation technology, such as wireless Profibus® or a wireless Foundation Fieldbus® variant. Further information regarding wireless network systems, especially wireless HART®, has been provided in the introduction above.

BRIEF DESCRIPTION OF THE DRAWINGS

The invention will now be explained in greater detail based on the appended drawing, the figures of which show as follows.

DETAILED DESCRIPTION

Figure 1:
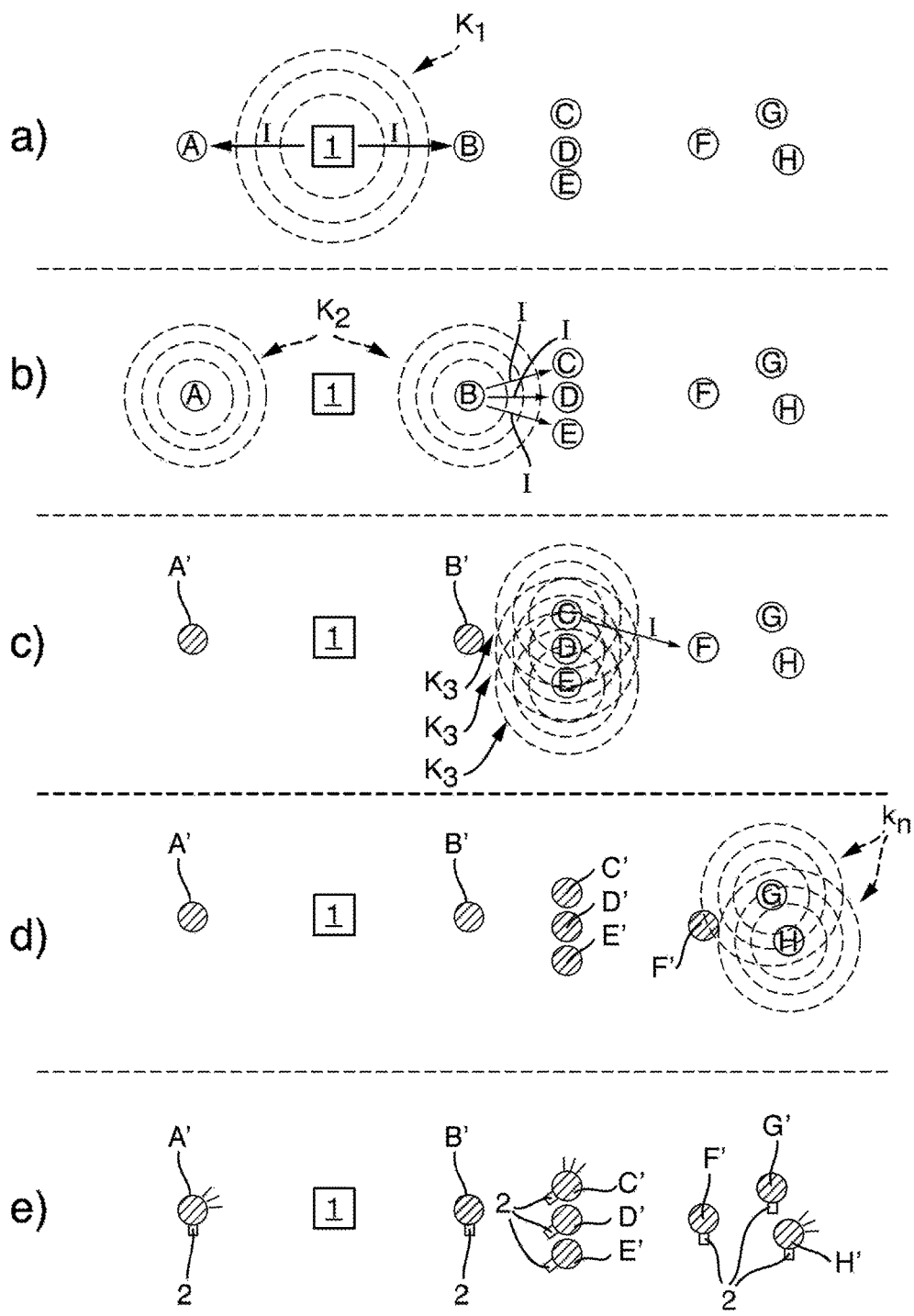
FIGS. 1 a)-e) show the steps of an advantageous embodiment of the method of the invention.

FIGS. 1 a)-e) show the steps of an advantageous embodiment of an example of the method of the invention. A plurality of potential receivers A, B, C, . . . , H are arranged around an initiator 1.

In FIG. 1 a), the initiator sends a first communication pulse $K_1$, which contains a first information I. The transmitting of the first communication pulse $K_1$ can occur automatically or on command of a user via a button on the initiator 1 or via a software command. The first communication pulse $K_1$ is transmitted spherically shaped from the initiator 1. The range of the first communication pulse $K_1$ is sufficiently large that it is received by the receivers A, B. The range of the first communication pulse $K_1$ is, however, not large enough to reach the remaining receivers C, D, E, . . . , H.

In FIG. 1 b), the receivers A, B evaluate the first communication pulse $K_1$ sent from the initiator 1 and obtain in this way the command to pass the first information I contained in the first communication pulse $K_1$ on. For such purpose, the receivers A, B, in each case, transmit an additional communication pulse $K_2$, which contains the same first information I of the first communication pulse $K_1$.

The communication pulse $K_2$ of the receiver A does not, in such case, reach any of the receivers B, C, . . . , H, because of which further transfer ends in this case. The communication pulse $K_2$ of the receiver B reaches the receivers C, D, E and is received by them. The range of communication pulse $K_2$ is, however, not large enough to reach the remaining receivers F, G, H. After their transmitting of the communication pulse $K_2$, the receivers A, B change into an acknowledgment mode, after which they are referred to as receivers A', B'.

In FIG. 1 c), the receivers C, D, E evaluate the additional communication pulse $K_2$ received from the receiver B' and obtain in this way the command to pass the first information I contained in the additional communication pulse $K_2$ on. For such purpose, the receivers C, D, E each transmit a communication pulse $K_3$, which contains the same first information I as in the first communication pulse $K_1$.

The communication pulses $K_3$ of the receivers C, D, E reach the receiver F. The communication pulse $K_3$ of the receiver C is, in such case, received first by receiver F and evaluated, while the lagging communication pulses $K_3$ of the receivers D, E are, consequently, ignored. The range of the communication pulses $K_3$ is, however, not large enough to reach the remaining receivers G, H. The communication pulses $K_3$ of the receivers C, D, F likewise reach the receiver BC. Since this is in the rest mode, the communication pulses $K_3$ are, consequently, ignored. The receivers C, D, E change after their transmitting of the communication pulse $K_3$ into an acknowledgment mode, so that they are then referred to as receivers C', D', E'.

In FIG. 1 d), we jump ahead to the last pass-on step. The receivers G, H evaluate a communication pulse, which they earlier obtained from the receiver F and, in this way, obtain the command to pass the first information I contained in this communication pulse on. For such purpose, the receivers G, H each transmit a last communication pulse $K_n$, which contains the same first information I as in the first communication pulse $K_1$. The last communication pulse $K_n$ of the receivers G, H reach, in such case, no as yet uninformed receivers A, B, C, . . . , H, because of which the passing-on is terminated and all receivers A, B, C, . . . , H have obtained a command with the first information I. The receivers G, H change after their transmitting of the last communication pulse Kn into an acknowledgment mode, after which they are then referred to as receivers G', H'.

FIG. 1 e) illustrates the last step of the invention for this form of embodiment. The receivers A', B', C', ..., H' are located in the acknowledgment mode. By pressing a button on the receiver housing, the receivers A', C', H are activated and execute the additional command contained in the information I. This can be, for example, a command for providing current process data to the initiator 1.

Figure 2:
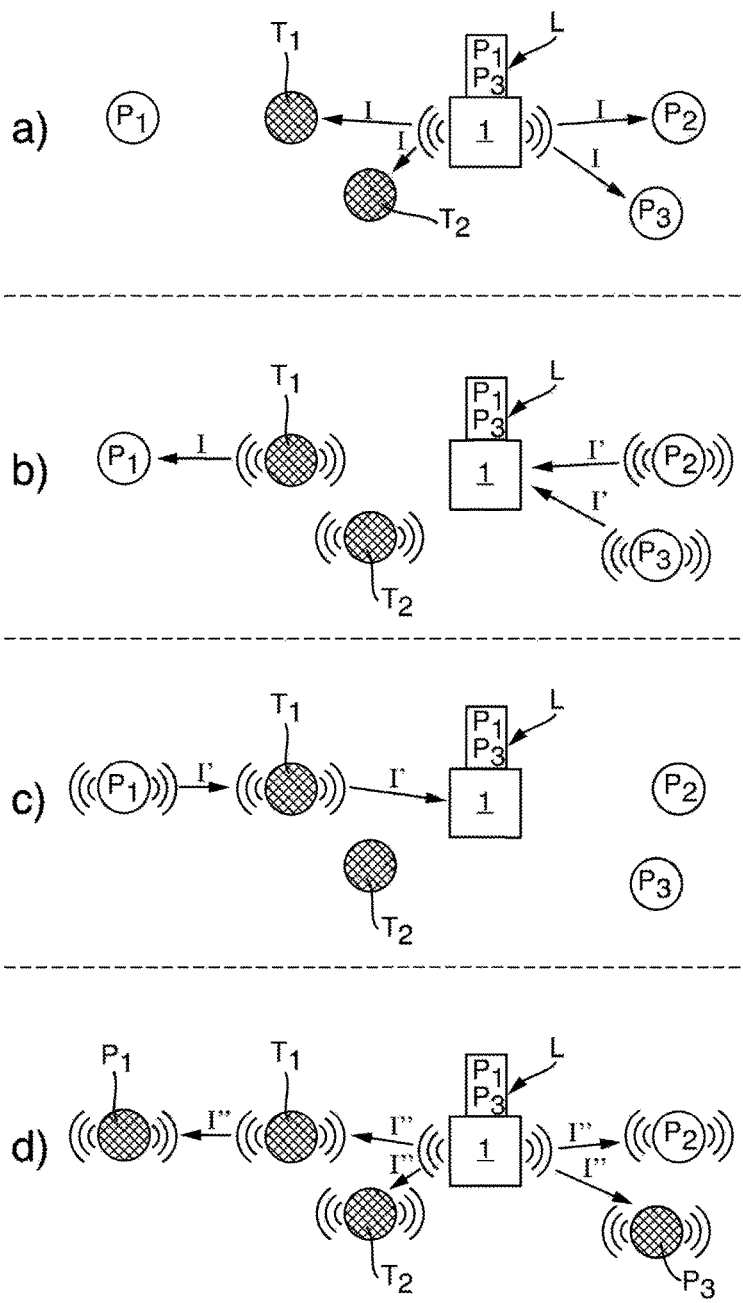
FIGS. 2 a)-d) show the steps of an advantageous embodiment of the method of the invention for integrating potential participants into a wireless network.

FIGS. 2 a)-d) show the steps of an advantageous embodiment of the method of the invention for integrating potential participants into a wireless network. A plurality of already integrated participants $T_1$, $T_2$ and potential participants $P_1$, $P_2$, $P_3$ are arranged around an initiator 1. The initiator 1 is, for example, a network manager, which has implemented an initiator function. The wireless network is a wireless HART® network.

In FIG. 2 a), the initiator 1 sends in a first communication pulse a first information I in the form of an invitation for integration into the wireless network. The first communication pulse reaches the participants $T_1$, $T_2$ and the potential participants $P_2$, $P_3$. The range of the first communication pulse is, however, not large enough to reach the potential participant $P_1$. The passing-on of the communication pulses is exactly as described in FIG. 1 and is repeated here in simplified form.

In FIG. 2 b), the participants $T_1$, $T_2$ and the potential participants $P_2$, $P_3$ evaluate the first communication pulse sent from the initiator 1 and, in this way, obtain the command to pass the first information contained in the first communication pulse I on. For such purpose, the participants $T_1$, $T_2$ and the potential participants $P_2$, $P_3$ each transmit an additional communication pulse, which contains the same first information I as in the first communication pulse. This additional communication pulse is received by the potential participant $P_1$.

Then, the invitation for integration into a wireless network is processed by the participants $T_1$, $T_2$ and the potential participants $P_2$, $P_3$. This contains the command that potential participants transmit identification data to the initiator 1. The participants $T_1$, $T_2$ do not react to this command, while the potential participants $P_2$, $P_3$ each transmit an additional communication pulse, with the additional information which contains the identification data of the potential participants $P_2$, $P_3$. These additionals communication pulses are received by the initiator 1.

In FIG. 2 c), the invitation for integration into a wireless network is processed by the potential participant $P_1$. The potential participant $P_1$ sends an additional communication pulse with the additional information which contains the identification data of the potential participants $P_1$. This additional communication pulse is received by the participant $T_1$.

Contained in the additional information I' is a command for passing this information I' on. The participant $T_1$, consequently, sends an additional communication pulse, which is received by the initiator 1.

In FIG. 2 d), the initiator compares the identification data of the potential receivers $P_1$, $P_2$, $P_3$, as received with the additional information with the identification data stored in a list L. The potential receivers $P_1$, $P_3$ are in the list, but $P_2$ is not. Then, the initiator sends an additional communication pulse with additional information I'', which contains network settings and network key for the potential participants $P_1$, $P_3$.

This additional communication pulse is received by the participants $T_1$, $T_2$ and by the potential participants $P_2$, $P_3$ and its additional information I'' is, in each case, passed on in an additional communication pulse. One of these communication pulses is received by the potential participant $P_1$ and passed on in an additional communication pulse, which, however, reaches no additional participants. Then, the potential participants $P_1$, $P_3$ process the additional information I'' and are integrated by suitable network settings and network key into the wireless network.

The invention claimed is:

1. A method of automation technology for wireless transmission of at least a first information between an initiator and a plurality of receivers initially operating in a receiving mode, comprising:
   transmitting a first communication pulse including the first information, the first information including a command for passing-on the first information and including at least one additional command, by the initiator;
   receiving the first communication pulse by at least one receiver of the plurality of receivers;
   transmitting an additional communication pulse including the first information, by the at least one receiver that received the first communication pulse;
   changing the at least one receiver that received the first communication pulse from the receiving mode to an acknowledgment mode;
   receiving the additional communication pulse by at least one receiver of the plurality of receivers operating in the receiving mode;
   repeating the transmitting of the additional communication pulse, the changing to the acknowledgement mode, and the receiving of the additional communication pulse until all of the plurality of receivers are changed to the acknowledgment mode;
   activating at least one receiver that is operating in the acknowledgment mode;
   executing the at least one additional command contained in the first information, by the activated receiver; and
   changing the at least one activated receiver to the receiving mode.

2. The method as claimed in claim 1, wherein the receivers that received the first communication pulse or the additional communication pulse change for a defined time to the acknowledgment mode before changing back to the receiving mode.

3. The method as claimed in claim 1, wherein a dedicated radio channel is used for transmitting the first communication pulse and the additional communication pulse.

4. The method as claimed in claim 1, wherein the additional communication pulse further includes a count of earlier sent pass-ons.

5. The method as claimed in claim 4, wherein the count of pass-ons is limited.

6. The method as claimed in claim 1, wherein a transmission power of the communication pulses is limited.

7. The method as claimed in claim 1, wherein the at least one receiver operating in the acknowledgment mode is activated by pressing a button on the at least one receiver.

8. The method as claimed in claim 1, wherein the at least one additional command includes a request for providing and/or for transmitting process data of a receiver to the initiator.

9. The method as claimed in claim 1, wherein the at least one additional command includes an invitation for integration into a wireless network and the receivers are either already integrated participants, which exclusively forward the first information or potential participants, which forward the first information and change into the acknowledgment mode.

10. The method as claimed in claim 9, further comprising:
sending a report back from at least one potential participant to the initiator after the activating of the potential participant;
sending access parameters for the wireless network from the initiator to the potential participant; and
integrating the potential participant into the wireless network.

11. The method as claimed in claim 9, further comprising:
the potential participant receiving a communication pulse and automatically sending identification data to the initiator without changing to the acknowledgment mode; and
the initiator comparing the identification data with a list and, in the case of agreement, automatically integrating the potential participant into the wireless network.

12. The method as claimed claim 1, further comprising:
after receipt of the first information, exchanging additional information bidirectionally between the at least one receiver and the initiator, wherein the additional information is passed on via the plurality of receivers and the plurality of receivers remain in the receiving mode.

13. A system for wireless transmission of at least a first information comprising:
an initiator configured to
transmit a first communication pulse including the first information, the first information including a command for passing-on the first information and further including at least one additional command; and
a plurality of receivers, each receiver configured to:
receive the first communication pulse,
transmit an additional communication pulse including the first information,
change from a receiving mode to an acknowledgement mode after receiving the first information,
receive the additional communication pulse when in the receiving mode,
change from the acknowledgement mode to an activated mode upon a button press on the receiver,
execute the at least one additional command when in the activated mode, and
change from the activated mode to the receiving mode.

14. The system as claimed in claim 13, wherein the initiator and the receivers are components of automation technology and include wireless communication units.

15. The system as claimed in claim 14, wherein the initiator is a superordinated unit and the receivers are field devices.

16. The system as claimed in claim 14, further comprising:
a wireless network, in the case of which the receivers are either already integrated participants or potential participants, wherein the wireless network is a wireless network of automation technology.

* * * * *